US010327384B2

(12) United States Patent
Johansson et al.

(10) Patent No.: US 10,327,384 B2
(45) Date of Patent: Jun. 25, 2019

(54) QUICK-COUPLING FOR MOWER BLADES

(71) Applicant: HUSQVARNA AB, Huskvarna (SE)

(72) Inventors: Jörgen Johansson, Jönköping (SE); Eric Lennings, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 696 days.

(21) Appl. No.: 14/774,826

(22) PCT Filed: Mar. 14, 2014

(86) PCT No.: PCT/US2014/028560
§ 371 (c)(1),
(2) Date: Sep. 11, 2015

(87) PCT Pub. No.: WO2014/152992
PCT Pub. Date: Sep. 25, 2014

(65) Prior Publication Data
US 2016/0037716 A1  Feb. 11, 2016

Related U.S. Application Data

(60) Provisional application No. 61/781,842, filed on Mar. 14, 2013.

(51) Int. Cl.
A01D 34/73    (2006.01)
A01D 34/64    (2006.01)
A01D 34/68    (2006.01)

(52) U.S. Cl.
CPC .......... *A01D 34/733* (2013.01); *A01D 34/64* (2013.01); *A01D 34/68* (2013.01)

(58) Field of Classification Search
CPC .... A01D 34/733; A01D 34/736; A01D 34/62; A01D 34/63; A01D 34/64; A01D 34/68; A01D 34/73; Y10S 464/901
See application file for complete search history.

(56) References Cited

U.S. PATENT DOCUMENTS 885,392 A     4/1908  Spets
2,875,569 A *  3/1959  Sauer .................. A01D 34/733
                                                       56/295

(Continued)

FOREIGN PATENT DOCUMENTS

EP    0158813 A1 * 10/1985  ........... A01D 34/733
EP    2430898 A1    3/2012
(Continued)

OTHER PUBLICATIONS

International Search Report & Written Opinion in International Patent Application No. PCT/US2014/027570, dated Jul. 29, 2014.

(Continued)

Primary Examiner — Thomas B Will
Assistant Examiner — Joan D Misa
(74) Attorney, Agent, or Firm — Burr Forman McNair

(57) ABSTRACT

A lawn care device may include a cutting deck housing at least one blade, a rotatable shaft, and a blade coupler operably coupled to the rotatable shaft. The blade coupler may define a blade channel configured to at least partially enclose four sides of a blade inserted therein. The blade coupler may include a support base and a sleeve that is movable relative to the support base based on a compression state of a biasing element. The blade may be insertable into the blade channel by orienting the blade to apply a force to sidewalls of the sleeve to shift the biasing element to a compressed state and rotating the blade proximate to the support base to enable the biasing element to shift to an extended state in which sidewalls of the sleeve define sidewalls of the blade channel.

20 Claims, 6 Drawing Sheets

(56) References Cited

U.S. PATENT DOCUMENTS

| | | | |
|---|---|---|---|
| 3,467,404 A | 9/1969 | Sloan | |
| 3,507,104 A * | 4/1970 | Kline | A01D 34/733 56/12.7 |
| 3,573,876 A | 4/1971 | Powell | |
| 3,692,319 A | 9/1972 | Taylor | |
| 3,709,508 A | 1/1973 | Dudley | |
| 3,837,661 A | 9/1974 | Phillippi | |
| 3,877,146 A | 4/1975 | Pittinger | |
| 4,213,289 A * | 7/1980 | Kamppinen | A01D 34/003 56/13.4 |
| 4,586,257 A | 5/1986 | Rittenhouse | |
| 4,657,428 A * | 4/1987 | Wiley | B24B 45/006 30/388 |
| 4,709,512 A | 12/1987 | Okubo et al. | |
| 4,712,364 A | 12/1987 | Oxley | |
| 4,730,952 A * | 3/1988 | Wiley | B24B 45/006 30/388 |
| 4,771,593 A | 9/1988 | Lee | |
| 4,787,147 A | 11/1988 | Wiley | |
| 5,036,654 A | 8/1991 | Malutich | |
| 5,791,131 A | 8/1998 | Hill et al. | |
| 5,820,135 A | 10/1998 | Han et al. | |
| 6,055,798 A | 5/2000 | Fulmer et al. | |
| 6,205,755 B1 | 3/2001 | Bontrager et al. | |
| 6,367,235 B1 | 4/2002 | Moynihan | |
| 6,769,846 B2 | 8/2004 | Campbell, Jr. et al. | |
| 6,935,095 B1 | 8/2005 | Sluder | |
| 7,124,566 B2 | 10/2006 | Treger et al. | |
| 7,387,563 B2 * | 6/2008 | Allemann | A61C 3/06 451/342 |
| 7,484,736 B2 * | 2/2009 | Allemann | B24B 45/006 279/143 |
| 7,784,254 B2 | 8/2010 | Bever | |
| 7,958,710 B2 | 6/2011 | Gilpatrick et al. | |
| 8,869,369 B1 * | 10/2014 | Roach | A01D 34/733 29/267 |
| 9,271,442 B2 * | 3/2016 | Pellenc | A01D 34/733 |
| 9,924,632 B2 * | 3/2018 | Chenevert | A01D 34/733 |
| 2003/0182917 A1 | 10/2003 | Wadzinski | |
| 2009/0308044 A1 * | 12/2009 | Bever | A01D 34/733 56/255 |
| 2009/0308045 A1 * | 12/2009 | Bever | A01D 34/733 56/295 |
| 2013/0269192 A1 * | 10/2013 | Pellenc | A01D 34/733 30/276 |
| 2015/0289447 A1 * | 10/2015 | Reichen | A01D 34/64 56/295 |
| 2016/0242355 A1 * | 8/2016 | Talaski | A01D 34/73 |
| 2017/0020067 A1 * | 1/2017 | Haun | A01D 34/733 |
| 2017/0332549 A1 * | 11/2017 | Ladd, Jr. | A01D 34/64 |

FOREIGN PATENT DOCUMENTS

| | | | | |
|---|---|---|---|---|
| FR | 1563526 A | * | 4/1969 | A01D 34/733 |
| FR | 2959152 A1 | * | 10/2011 | A01D 34/733 |
| GB | 1249112 A | | 10/1971 | |
| WO | WO-2011131859 A2 | * | 10/2011 | A01D 34/733 |
| WO | WO-2011131860 A1 | * | 10/2011 | A01D 34/416 |
| WO | WO-2016037184 A1 | * | 3/2016 | A01D 34/733 |

OTHER PUBLICATIONS

International Search Report & Written Opinion in International Patent Application No. PCT/US2014/028560, dated Mar. 27, 2015.
International Preliminary Report on Patentability in International Patent Application No. PCT/US2014/027570 dated Sep. 15, 2015.

* cited by examiner

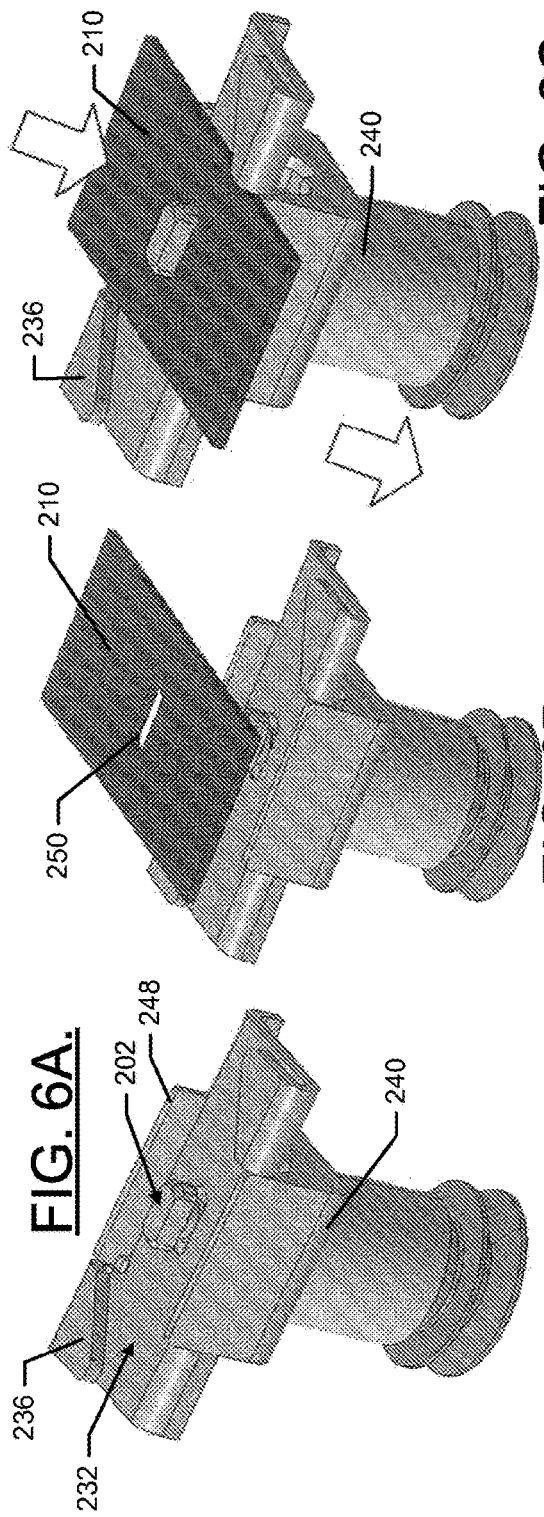

QUICK-COUPLING FOR MOWER BLADES

TECHNICAL FIELD

Example embodiments generally relate to outdoor power equipment and, more particularly, some embodiments relate to a lawn mower with a blade assembly that has blades that can be quickly removed and/or replaced.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines, and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers, and/or the like) in addition to grass cutting components. Riding lawn mowers provide the convenience of a riding vehicle as well as a typically larger cutting deck as compared to a walk-behind model.

The cutting blades of a lawn mower are an important, but sometimes overlooked, component of the lawn mower. The sharpness of the lawn mower blade impacts the quality of cut achieved using the corresponding blade. In this regard, for example, if a blade is not sharp, blades of grass may receive an uneven cut and the ends of the grass may tend to brown, leaving a less desirable appearance to the lawn and increasing susceptibility to some diseases. Meanwhile, using a sharp blade can achieve a cleaner cut that leaves a more appealing appearance to the cut lawn.

Blade sharpening or replacement requires removal of the blade from the lawn mower. Some lawn mower operators may be intimidated by the prospect of removing the blades either due to their perception of the complexity or difficulty of the task or due to their perception of the likelihood that tools that they do not possess may be required to complete the task.

In some cases, different styles of blades may be employed for cutting, mulching, or other lawn care tasks. An unwillingness or lack of desire to make blade changes can also cause lawn mower operators to fail to achieve the full potential of their lawn mowers.

BRIEF SUMMARY OF SOME EXAMPLES

Some example embodiments may provide a quick-change blade system that may allow users to make blade changes on a lawn mower relatively quickly and easily. In this regard, for example, some embodiments may provide for blade designs and corresponding mounting apparatuses that may enable operators to change blades without requiring the use of tools. Furthermore, some example embodiments may provide for a blade change system that can be operated with only one hand.

Some example embodiments may improve the ability of operators to change blades quickly and easily. Operators may therefore take fuller advantage of the capabilities of their lawn mowers, and have a greater satisfaction with the performance of their lawn mowers.

It will be appreciated that, although some embodiments of the invention are illustrated herein as providing a quick-change system for blades on a lawn mower (e.g., a riding lawn mower, a walk-behind lawn mower, or the like), the quick-change mounting apparatuses described herein may be used to similarly couple other devices together. For example, the mounting apparatuses described herein may be used to couple cutting elements to other types of lawn care equipment, such as trimmers, edgers, circular saws, chainsaws, and/or the like. The mounting apparatuses may also be used to couple rotary elements in devices other than lawn care equipment. For example, the mounting apparatuses described herein may be used to attach fan blades to a fan.

In an example embodiment, a lawn care device may be provided. The device may include a cutting deck housing at least one blade, a rotatable shaft, and a blade coupler operably coupled to the rotatable shaft. The blade coupler may define a blade channel configured to at least partially enclose four sides (e.g., a top face, bottom face and the two sides connecting the top and bottom faces) of a blade inserted therein. The blade coupler may include a support base and a sleeve that is movable relative to the support base based on a compression state of a biasing element. The blade may be insertable into the blade channel by orienting the blade to apply a force to sidewalls of the sleeve to shift the biasing element to a compressed state and rotating the blade proximate to the support base to enable the biasing element to shift to an extended state in which sidewalls of the sleeve define sidewalls of the blade channel.

In another example embodiment, a blade coupler for coupling a blade to a rotatable shaft may be provided. The blade coupler may include a blade channel configured to at least partially enclose four sides of the blade responsive to insertion of the blade therein, a support base, and a sleeve that is movable relative to the support base based on a compression state of a biasing element. The blade may be insertable into the blade channel by orienting the blade to apply a force to sidewalls of the sleeve to shift the biasing element to a compressed state and rotating the blade proximate to the support base to enable the biasing element to shift to an extended state in which sidewalls of the sleeve define sidewalls of the blade channel.

In another example embodiment, a blade coupler for coupling a blade to a rotatable shaft may be provided. The blade coupler may include a blade channel configured to at least partially enclose the blade responsive to insertion of the blade in the blade channel, a support base, and a sleeve configured to move relative to the support base. The sleeve may include a sidewall, and the sidewall may include a distal end. In addition, during insertion of the blade in the blade channel, the sleeve may be configured to move such that the distal end of the sidewall is made substantially level with the support base to allow the blade to rotate relative to the support base, and to move such that the sidewall blocks further rotation of the blade.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 6, which includes FIGS. 6A, 6B, 6C, 6D, and 6E, illustrates several steps associated with installation of a blade using the blade coupler of an example embodiment.

DETAILED DESCRIPTION

Figure 1A:
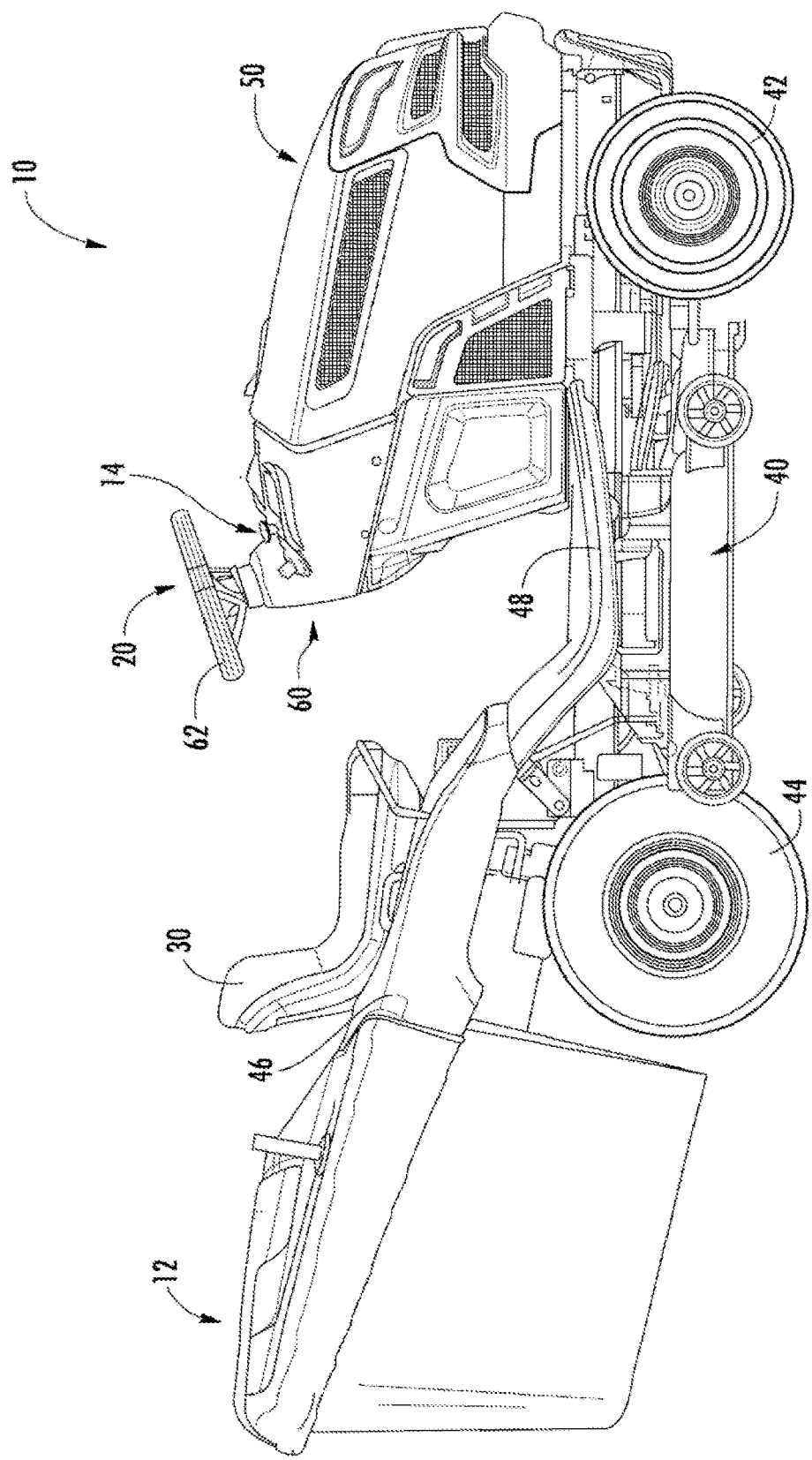
FIG. 1A illustrates a side view of a riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf, or sod care. As used herein, operable coupling should be understood to relate to direct or indirect connection that, in either case, enables functional interconnection of components that are operably coupled to each other.

In an example embodiment, a lawn mower is provided with a quick-change blade system. The quick-change blade system may include a mounting apparatus that may take any of a plurality of different forms. Some example mounting apparatus designs are described herein. Although the mounting apparatuses may take different forms, each of the mounting apparatuses may generally provide operators with an ability to relatively easily remove and/or replace lawn mower blades using the mounting apparatus. In some cases, the removal and/or replacement may be performed without any tools and, in some cases, with the use of only one hand. Furthermore, some embodiments may even make it possible for an operator to easily disconnect or connect a blade without requiring, for example, jacking up of the lawn mower or removal of the deck since some embodiments may be easy and safe enough to use to allow an operator to reach under a deck and operate the mounting apparatus in a small amount of space or without a direct line of sight.

Some embodiments of the mounting apparatus may be sold as part of the lawn mower either permanently or removably attached to the spindle. However, in other instances, embodiments of the mounting apparatus may be sold separately from the lawn mower and configured to allow older model lawn mowers to be retrofitted with a mounting apparatus of an example embodiment.

Figure 1B:
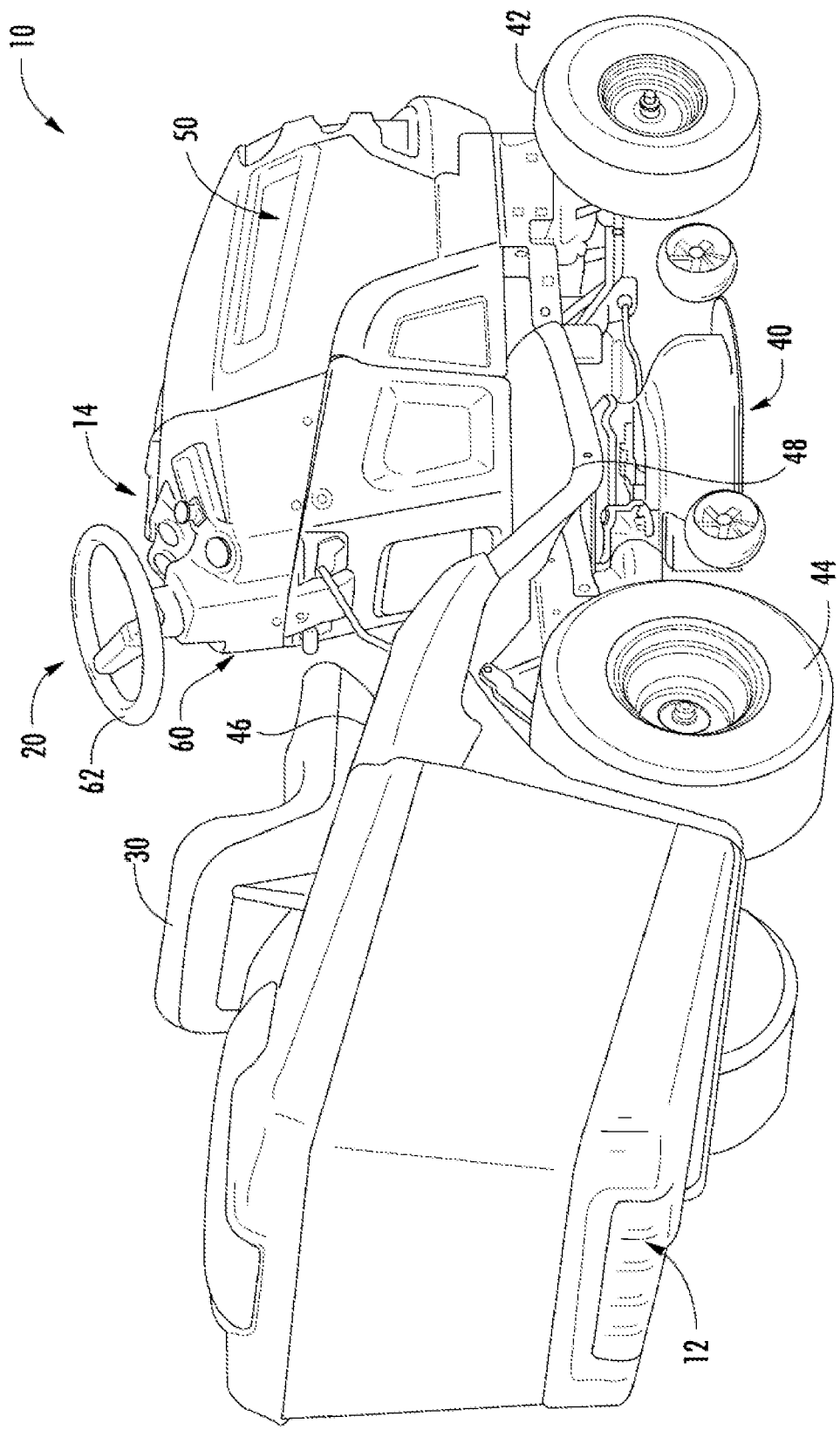
FIG. 1B illustrates a perspective view of the riding lawn care vehicle according to an example embodiment.

FIG. 1, which includes FIGS. 1A and 1B, illustrates an example of a riding lawn care vehicle 10 having a bagging attachment 12. However, it should be appreciated that example embodiments may be employed on numerous other riding lawn care vehicles that may not include a bagging attachment 12. The riding lawn care vehicle 10 may also include an information panel 14 displaying operational information regarding the riding lawn care vehicle 10. As shown and described herein, the riding lawn care vehicle 10 may be a riding lawn mower (e.g., a lawn tractor, front-mount riding lawn mower, zero-turn riding lawn mower, cross mower, stand-on riding lawn mower, and/or the like). However, other example embodiments may be employed on other lawn mowers, such as robotic mowers, walk behind lawn mowers, remote-controlled lawn mowers, and/or the like.

FIG. 1A illustrates a side view of the riding lawn care vehicle 10 and FIG. 1B illustrates a perspective view of the riding lawn care vehicle 10. The riding lawn care vehicle 10 may include a steering assembly 20 (e.g., including a steering wheel, handle bars, or other steering apparatus) functionally connected to wheels of the riding lawn care vehicle 10 to which steering inputs are provided (e.g., the front and/or rear wheels in various different embodiments) to allow the operator to steer the riding lawn care vehicle 10. In some embodiments, the riding lawn care vehicle 10 may include a seat 30 that may be disposed at a center, rear, or front portion of the riding lawn care vehicle 10. The operator may sit on the seat 30, which may be disposed to the rear of the steering assembly 20 to provide input for steering of the riding lawn care vehicle 10 via the steering assembly 20.

The riding lawn care vehicle 10 may also include, or be configured to support attachment of, a cutting deck 40 having at least one cutting blade mounted therein. In some cases, a height of the at least one cutting blade may be adjustable by an operator of the riding lawn care vehicle 10. The cutting deck 40 may be a fixed or removable attachment in various different embodiments. Moreover, a location of the cutting deck 40 may vary in various alternative embodiments. For example, in some cases the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. In some embodiments, the cutting deck 40 may be lifted or rotated relative to the lawn mower frame to permit easier access to the underside of the lawn mower without requiring removal of the cutting deck 40. The cutting deck 40 may have one, two, three, or more cutting blades driven by one, two, three, or more rotatable shafts. The shafts may be rotated by any number of mechanisms. For example, in some embodiments, the shafts are coupled to a motor via a system of belts and pulleys. In other embodiments, the shafts may be coupled to the motor via a system of universal joints, gears, and/or other shafts. In still other embodiments, such as in an electric lawn mower, the shaft may extend directly from an electric motor positioned over the cutting deck.

In some embodiments, the front wheels 42 and/or the rear wheels 44 may have a shielding device positioned proximate thereto in order to prevent material picked up in the wheels from being ejected toward the operator. Fender 46 is an example of such a shielding device. When operating to cut grass, the grass clippings may be captured by a collection system (e.g., bagging attachment 12), mulched, or expelled from the cutting deck 40 via either a side discharge or a rear discharge.

The riding lawn care vehicle 10 may also include additional control related components such as one or more speed controllers, cutting height adjusters and/or the like. Some of the controllers, such as the speed controllers, may be provided in the form of foot pedals that may sit proximate to a footrest 48 (which may include a portion on both sides of the riding lawn care vehicle 10) to enable the operator to rest his or her feet thereon while seated in the seat 20.

In the pictured example embodiment of FIG. 1, an engine 50 of the riding lawn care vehicle 10 is disposed substantially forward of a seated operator. However, in other example embodiments, the engine 50 could be in different positions such as below or behind the operator. In some embodiments, the engine 50 may be operably coupled to one or more of the wheels of the riding lawn care vehicle 10 in order to provide drive power for the riding lawn care vehicle 10. In some embodiments, the engine 50 may be capable of powering two wheels, while in others, the engine 50 may power all four wheels of the riding lawn care vehicle 10. Moreover, in some cases, the engine 50 may manually or automatically shift between powering either two wheels or all four wheels of the riding lawn care vehicle 10. The engine 50 may be housed within a cover that forms an engine compartment to protect engine 50 components and improve the aesthetic appeal of the riding lawn care vehicle 10.

In an example embodiment, the engine compartment may be positioned proximate to and/or mate with portions of a steering assembly housing 60. The steering assembly housing 60 may house components of the steering assembly 20 to protect such components and improve the aesthetic appeal of the riding lawn care vehicle 10. In some embodiments, a steering wheel 62 of the steering assembly 20 may extend from the steering assembly housing 60 and a steering column (not shown) may extend from the steering wheel 62 down through the steering assembly housing 60 to components that translate inputs at the steering wheel 62 to the wheels to which steering inputs are provided.

In some embodiments, the engine 50 may also provide power to turn the cutting blade or blades disposed within the cutting deck 40. In this regard, for example, the engine 50 may be used to turn a shaft upon which the cutting blade or blades may be fixed (e.g., via a belt and pulley system and/or other mechanisms). The turning of the shaft, at high speeds, may move the cutting blade or blades through a range of motion that creates air movement that tends to straighten grass for cutting by the moving blade and then eject the cut grass out of the cutting deck 40 (e.g., to the bagging attachment 12 or to the back or side of the riding lawn care vehicle 10), unless the blade and mower are configured for mulching.

The turning of the shaft at high speeds should also be appreciated to cause relatively high centrifugal forces to be generated. A typical lawnmower blade must be held onto the shaft with a screw having a relatively large amount of torque applied thereto. For example, some blade designs may require between 36 Nm and 70 Nm of torque to be applied for holding the blades. Working in these torque ranges can make it difficult for operators to remove blades, and can also make the application of the correct amount of torque difficult to accomplish after blade replacement. However, in some example embodiments, the large amount of centrifugal force can be used to apply holding torque or a clamping force on the blade. Moreover, according to an example design, the clamping force may increase as the speed of the rotation of the blade increases.

Figure 3:
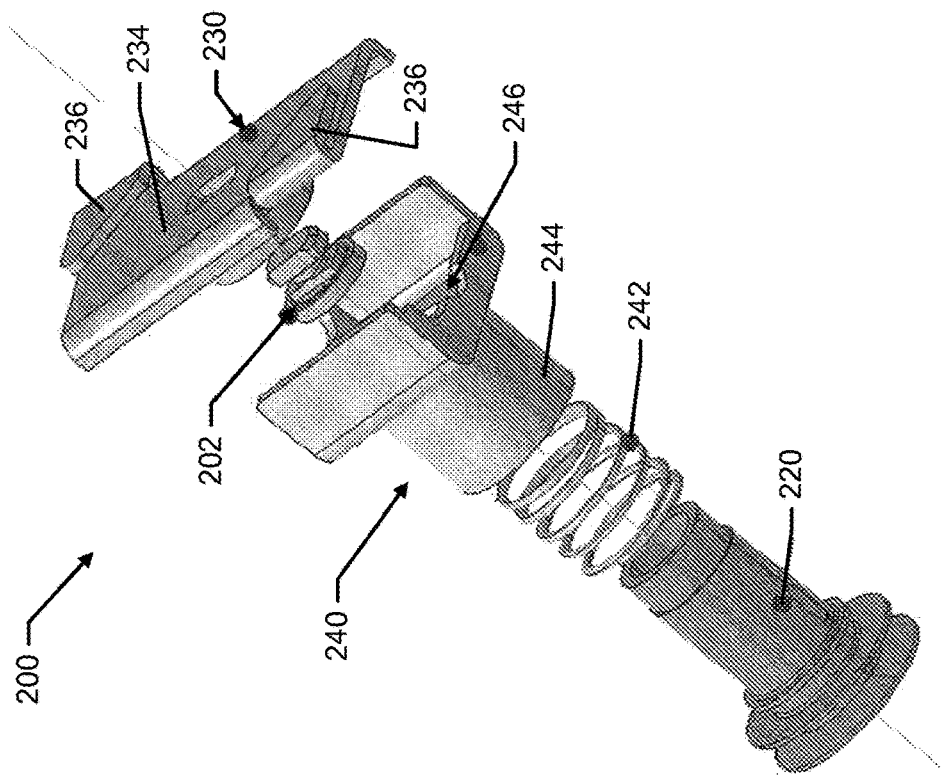
FIG. 3 illustrates an exploded perspective view of the blade coupler in accordance with an example embodiment.
Figure 2:
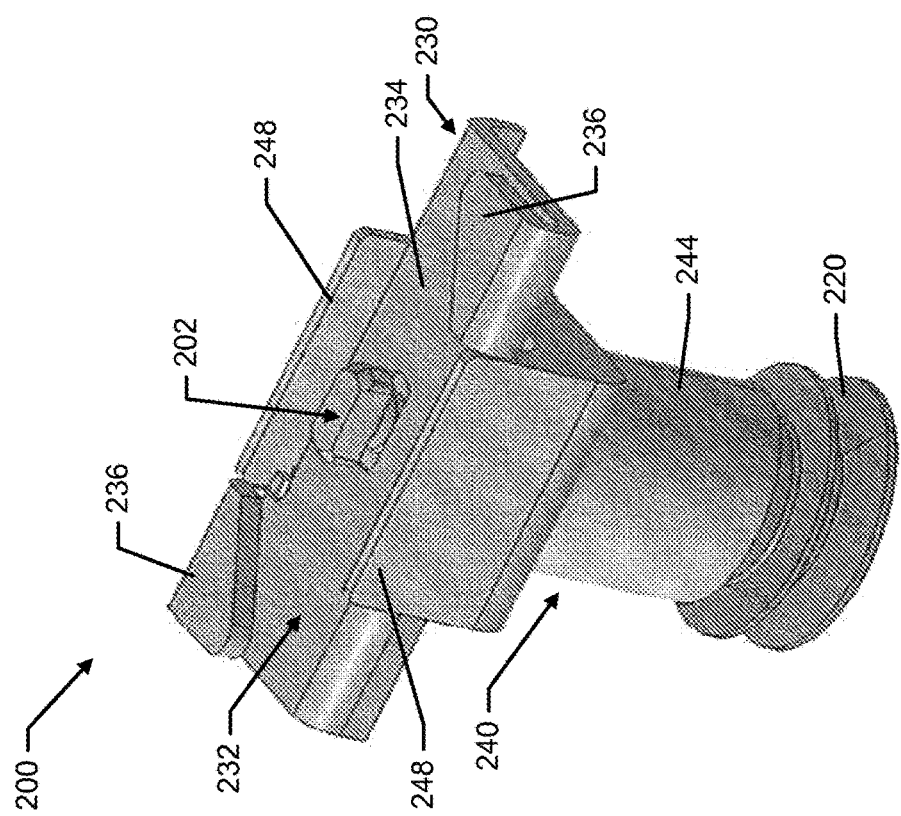
FIG. 2 shows a perspective view of a blade coupler of an example embodiment.
Figure 4:
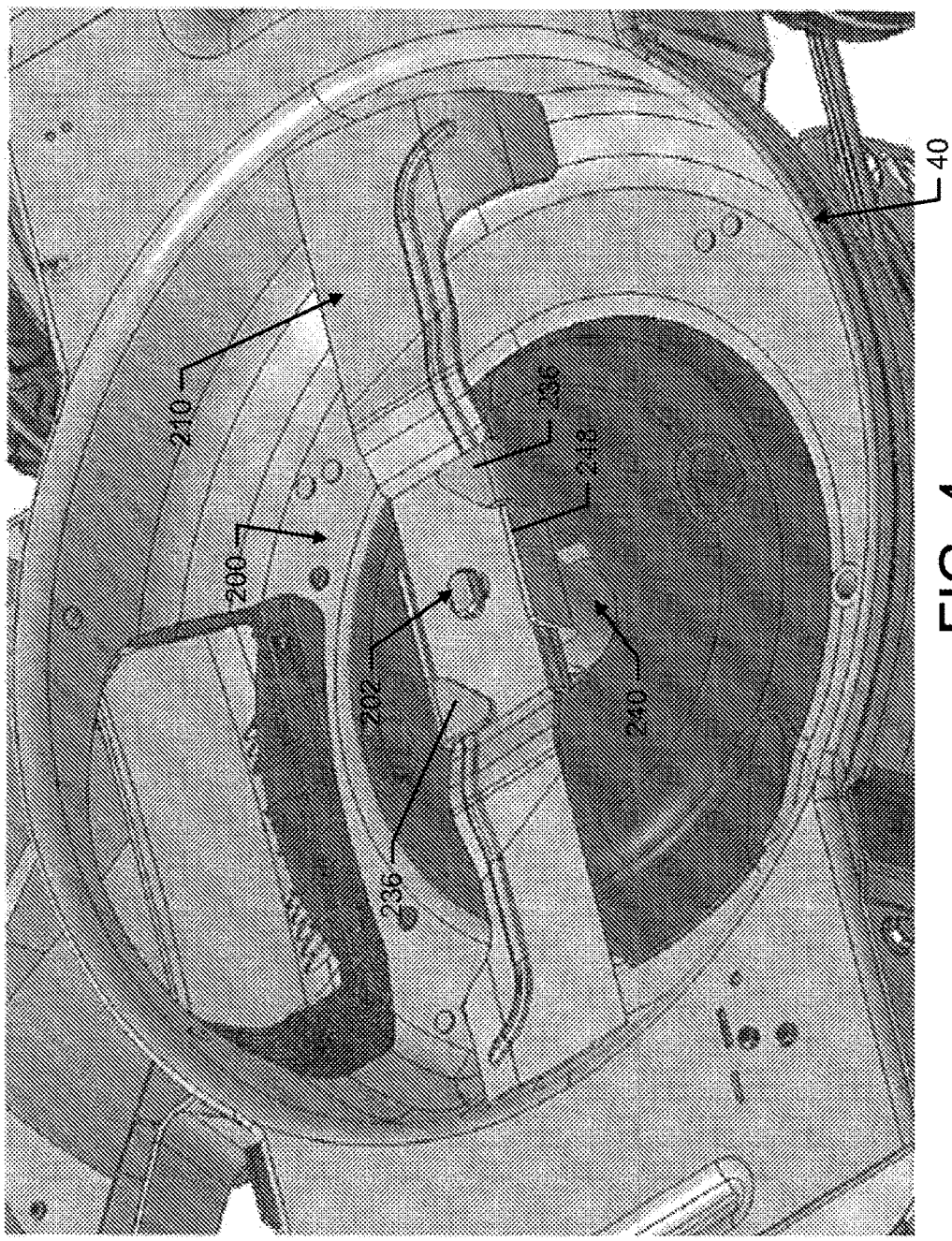
FIG. 4 illustrates a perspective view of the blade coupler holding a blade within the cutting deck of a mower according to an example embodiment.
Figure 5:
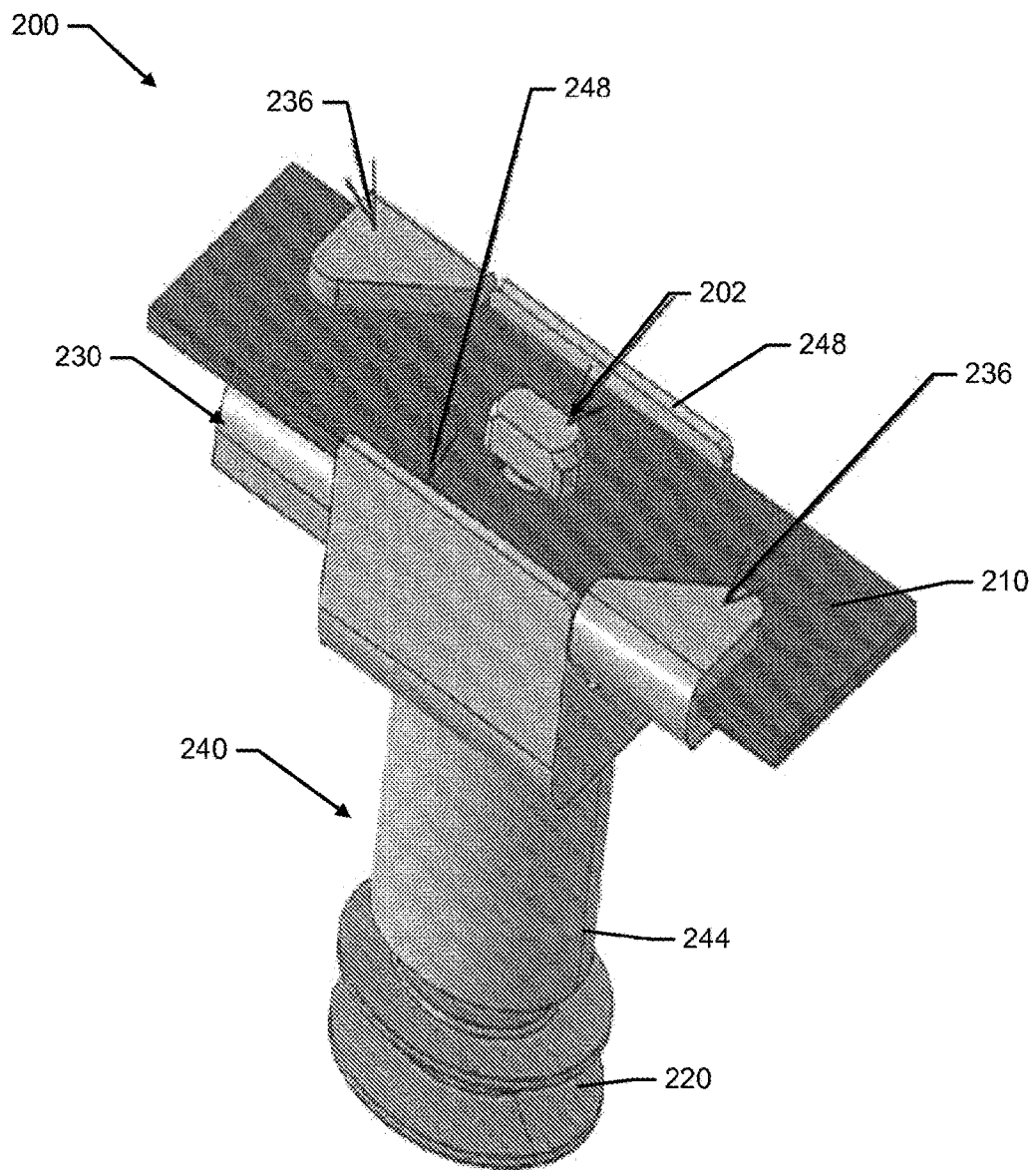
FIG. 5 illustrates a perspective view of the blade coupler holding a blade according to an example embodiment.

FIG. 2 shows a perspective view of a blade coupler of an example embodiment. FIG. 3 illustrates an exploded perspective view of the blade coupler in accordance with an example embodiment. FIG. 4 illustrates a perspective view of the blade coupler holding a blade within the cutting deck of a mower according to an example embodiment. FIG. 5 illustrates a perspective view of the blade coupler holding a blade according to an example embodiment. FIG. 6, which includes FIGS. 6A, 6B, 6C, 6D and 6E, illustrates several steps associated with installation of a blade using the blade coupler of an example embodiment.

Referring now to FIGS. 2 to 6, a blade coupler 200 of an example embodiment is provided. The blade coupler 200 may be configured to hold a blade 210 during rotation of the shaft (sometimes called a spindle) of the mower so that the rotation of the blade 210 may cut vegetation. The blade 210 may be attached to the shaft via the blade coupler 200. Some example embodiments may provide for the inclusion of a mounting apparatus (e.g., blade coupler 200), which may enable the blade 210 to be removed without tools and, in some cases, without requiring tipping, removal, or elevation of the cutting deck 40. The blade coupler 200 may be operably coupled to the shaft. For example, the blade coupler 200 may be directly affixed to the shaft via a bolt. In this regard, for example, the bolt may pass through an opening in a center portion of the blade coupler 200 and may be tightened to affix the blade coupler 200 to the shaft. In some cases, the bolt may terminate at, or be operably coupled to, a locking pin 202 that may engage the blade 210 as described in greater detail below.

In some embodiments, the shaft may be housed within a housing 220 that may protect the shaft from debris that may impact the rotatability of the shaft. The housing 220 may be operably coupled to a blade support 230 that may define a blade channel 232 into which the blade 210 may be provided for secured, and yet removable, operable coupling with the shaft. The blade channel 232 is a space defined by portions of the blade support 230 into which the blade 210 is configured to fit when the blade 210 is installed. In an example embodiment, a sleeve 240 may be provided to define a portion of the blade channel 232 when the blade 210 is installed. The sleeve 240 may be biased away from the housing 220 by a biasing element 242 (e.g., a helical spring or the like).

In an example embodiment, the sleeve 240 may have a cylindrical portion 244 that may ride or slide over a portion of the housing 220 and the biasing element 242 may be provided between a portion of the housing 220 and the sleeve 240. The sleeve 240 may further include a blade support receiver 246 and sidewalls 248 that may engage lateral sides of the blade support 230. The sleeve 240 may have an extended (normal) position in which the biasing element 242 pushes the sidewalls 248 along the sides of the blade support 230 to define sides of the blade channel 232. The sleeve 240 may also have a compressed position in which the biasing element 242 is compressed by force so that the sleeve 240 moves closer to a base of the housing 220 so that the sidewalls 248 are no longer extended to form sides of the blade channel 232. In some cases, while the sleeve 240 is in the compressed position, end portions of the sidewalls 248 may be compressed to the point that distal ends of the sidewalls 248 are made substantially level with a support base 234 of the blade support 230.

In an example embodiment, lateral longitudinal sides of the blade channel 232 may be defined by the sidewalls 248 (e.g., when the sleeve 240 is in the extended position), and a top of the blade channel 232 may be defined by the support base 234, which may support a center portion of a top portion of the blade 210 when the blade 210 is installed. Meanwhile, a bottom portion of the blade channel 232 may be defined by tongues 236 that may extend from the support base 234 around sides of the blade 210 to extend over a portion of the bottom face of the blade 210 when the blade 210 is installed. In an example embodiment, the tongues 236 may be angled and the angled faces thereof may be substantially parallel to each other and spaced apart such that lines extending along the respective angled faces are distant from each other by about the transverse length of the blade 210. Meanwhile, when the blade 210 is installed in the blade channel 232, the longitudinal length of the blade 210 will lie parallel to the longitudinal length of the support base 234 and extend out opposite ends thereof as shown in FIG. 4.

In an example embodiment, the locking pin 202 may have a head portion that has a shape that substantially matches a shape of a receiving orifice 250 defined at a longitudinal and transverse center of the blade 210. In the example of FIGS. 2-6, the head portion has a substantially oval shape. However, any shape that permits the blade 210 to be slid over the locking pin 202 in one orientation and then rotated to be held by the locking pin 202 after such rotation would be suitable for use. In still other embodiments, the locking pin 202 could just be round; however, in some cases, it could be considered helpful to have additional clamping or holding force applied by the head portion of the locking pin 202.

Accordingly, in one example embodiment, the receiving orifice 250 may be configured to be slidable over the locking pin 202 while the longitudinal length of the blade 210 is substantially perpendicular to the longitudinal length of the support base 232, while the sleeve 240 is in the compressed position. Then, after the blade 210 is passed over the head portion, the blade 210 may be rotated (e.g., about a round portion of the locking pin 202 that is disposed inwardly from the head portion) until the blade 210 fits into the blade channel 232. When the blade 210 fits within the blade channel 232, the blade 210 may be locked therein by the sidewalls 248 of the sleeve 240 being released to the extended position to hold the sides of the blade 210 in place in combination with the tongues 236 as shown in FIG. 5.

As shown in FIG. 6A, the locking pin 202 may have a head portion with a longitudinal length that is substantially parallel to the longitudinal length of the blade channel 232 formed by the tongues 236, the support base 234, and the sidewalls 248 of the sleeve 240 while the sleeve 240 is in the extended position. As shown in FIG. 6B, the blade 210 may have an oval shaped receiving orifice 250 provided at the longitudinal and transverse center thereof. The longitudinal length of the receiving orifice 250 may extend along the transverse centerline of the blade 210. The receiving orifice 250 may be aligned with the locking pin 202. As shown in FIG. 6C, the blade 210 may be pushed toward the sleeve 240 to exert a force through the sidewalls 248 to push the sidewalls 248 toward the housing 220 and thereby move the sleeve 240 to the compressed position as the locking pin 202 is passed through the receiving orifice 250. As shown in FIG. 6D, the blade 210 may be rotated so that lateral sides of the blade 210 approach the tongues 236. During this rotation, the head portion of the locking pin 202 may begin to hold the blade 210 as portions of the blade 210 slide under portions of the head portion of the locking pin 202. As shown in FIG. 6E, when the lateral sides of the blade 210 reach the tongues 236, the sidewalls 248 may no longer be blocked by the blade 210 so that the sleeve 240 is enabled to move back to the extended position. The sidewalls 248 may therefore block further rotation of the blade 210, and the blade 210 may be locked into the blade channel 232. In this position, the orientation of the blade 210 may be substantially perpendicular to the orientation of the blade 210 when the installation began (e.g., in the operations shown in FIGS. 6B and 6C. Further, in this position, each of the tongues 236 extends over, wraps around, contacts, overlaps, and/or secures at least a portion of the bottom face of the blade 210.

Although some example embodiments have been described above in the context of employment within the cutting deck of a riding lawn mower, it should be appreciated that example embodiments may also be practiced in other contexts as well. For example, numerous other types of outdoor power equipment that employ blades could benefit from employment of quick-change blade technology as described herein. Thus, example embodiments may be practiced on either riding or walk behind lawn mower models as well as in connection with trimmers, edgers, circular saws, chain saw bars, agricultural equipment, and/or the like. Still other example embodiments may be practiced on other devices as well. For example, some embodiments of the quick-change mounting systems may be used to attach fan blades to a fan and/or other rotary elements to a rotating spindle.

Moreover, as indicated above, some models may be produced from the factory with quick-change fittings installed. However, other models may be retrofitted by installing a blade mount in a similar fashion to that which was previously used to install the blades themselves. Once the blade mount is in place, quick-change blades may be employed even by older models.

In an example embodiment, a lawn care device may include a cutting deck housing at least one blade, a rotatable shaft, and a blade coupler operably coupled to the rotatable shaft. The blade coupler may define a blade channel configured to at least partially enclose four sides (e.g., a top face, bottom face and the two sides connecting the top and bottom faces) of a blade inserted therein. The blade coupler may include a support base and a sleeve that is movable relative to the support base based on a compression state of a biasing element. The blade may be insertable into the blade channel by orienting the blade to apply a force to sidewalls of the sleeve to shift the biasing element to a compressed state and rotating the blade proximate to the support base to enable the biasing element to shift to an extended state in which sidewalls of the sleeve define sidewalls of the blade channel.

The device of some embodiments may include additional features that may be optionally added either alone or in combination with each other. For example, in some embodiments, (1) the blade coupler may include a locking pin operably coupled to the rotatable shaft. The locking pin may have a head portion shaped to fit within a receiving orifice of the blade. In some cases, (2) the head portion holds a center portion of the blade responsive to insertion of the blade in the blade channel. In an example embodiment, (3) the receiving orifice may be shaped to fit over the head portion when a longitudinal length of the blade is oriented substantially perpendicular to a longitudinal length of the support base. The longitudinal length of the blade channel may lie substantially parallel to the longitudinal length of the support base.

In some embodiments, any or all of (1) to (3) may be employed in addition to the optional modifications or augmentations described below. For example, in some embodiments, the support base may include tongues disposed on opposite sides of the blade channel. The support base may form a top portion of the blade channel, and the tongues may extend to form a bottom portion of the blade channel. In some cases, two tongues may be provided on opposite sides of the locking pin relative to a longitudinal length of the support base. Additionally or alternatively, each of the tongues may include a first surface that lies substantially perpendicular to the longitudinal length of the support base, and a second surface that lies at an angle relative to the first surface. The second surfaces of the tongues may extend substantially parallel to each other. Additionally or alternatively, the sidewalls may extend along lateral sides of the blade responsive to insertion of the blade into the blade channel. It should also be appreciated that although FIG. 1 illustrates a riding lawn care device, the device on which example embodiments are practiced may be a ride on lawn care device or a walk behind lawn care device. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A lawn care device comprising:
a cutting deck housing a blade;
a rotatable shaft; and
a blade coupler operably coupled to the rotatable shaft, the blade coupler defining a blade channel configured to at least partially enclose four sides of the blade inserted therein, the four sides comprising a top face, a bottom face, and two lateral sides each connecting the top face and bottom face of the blade,
wherein the blade coupler comprises a support base and a sleeve that is movable relative to the support base based on a compression state of a biasing element,
wherein the blade is insertable into the blade channel by orienting the blade to apply a force to sidewalls of the sleeve to shift the biasing element to a compressed state and rotating the blade proximate to the support base to enable the biasing element to shift to an extended state in which said sidewalls of the sleeve define sidewalls of the blade channel.

2. The lawn care device of claim 1, wherein the blade coupler comprises a locking pin operably coupled to the rotatable shaft, the locking pin having a head portion shaped to fit within a receiving orifice of the blade.

3. The lawn care device of claim 2, wherein the head portion holds a center portion of the blade responsive to insertion of the blade in the blade channel.

4. The lawn care device of claim 3, wherein the receiving orifice is shaped to fit over the head portion when a longitudinal length of the blade is oriented substantially perpendicular to a longitudinal length of the support base, and wherein the longitudinal length of the blade channel lies substantially parallel to the longitudinal length of the support base.

5. The lawn care device of claim 4, wherein the support base comprises tongues disposed on opposite sides of the blade channel, the support base forming a top portion of the blade channel and the tongues extending to form a bottom portion of the blade channel.

6. The lawn care device of claim 5, wherein the tongues comprise two tongues, and wherein the two tongues are provided on opposite sides of the locking pin relative to a longitudinal length of the support base.

7. The lawn care device of claim 6, wherein each of the two tongues comprises a first surface that lies substantially perpendicular to the longitudinal length of the support base, and a second surface that lies at an angle relative to the first surface, and wherein the second surfaces of the two tongues extend substantially parallel to each other.

8. The lawn care device of claim 1, wherein the sidewalls extend along the two lateral sides of the blade responsive to insertion of the blade into the blade channel.

9. The lawn care device of claim 1, wherein the device is a ride on lawn care device or a walk behind lawn care device.

10. The lawn care device of claim 1, wherein the two lateral sides of the blade are parallel to one another and disposed on opposite sides of the blade.

11. A blade coupler for coupling a blade to a rotatable shaft, the blade coupler comprising:
a blade channel configured to at least partially enclose four sides of the blade responsive to insertion of the blade therein, the four sides comprising a top face, a bottom face, and two lateral sides each connecting the top face and bottom face of the blade;
a support base; and
a sleeve that is movable relative to the support base based on a compression state of a biasing element,
wherein the blade is insertable into the blade channel by orienting the blade to apply a force to sidewalls of the sleeve to shift the biasing element to a compressed state and rotating the blade proximate to the support base to enable the biasing element to shift to an extended state in which said sidewalls of the sleeve define sidewalls of the blade channel.

12. The blade coupler of claim 11, further comprising a locking pin operably coupled to the rotatable shaft, the locking pin having a head portion shaped to fit within a receiving orifice of the blade.

13. The blade coupler of claim 12, wherein the head portion holds a center portion of the blade responsive to insertion of the blade in the blade channel.

14. The blade coupler of claim 13, wherein the receiving orifice is shaped to fit over the head portion when a longitudinal length of the blade is oriented substantially perpendicular to a longitudinal length of the support base, and wherein a longitudinal length of the blade channel lies substantially parallel to the longitudinal length of the support base.

15. The blade coupler of claim 14, wherein the support base comprises tongues disposed on opposite sides of the blade channel, the support base forming a top portion of the blade channel and the tongues extending to form a bottom portion of the blade channel.

16. The blade coupler of claim 15, wherein the tongues comprise two tongues, and wherein the two tongues are provided on opposite sides of the locking pin relative to the longitudinal length of the support base.

17. The blade coupler of claim 16, wherein each of the two tongues comprises a first surface that lies substantially perpendicular to the longitudinal length of the support base, and a second surface that lies at an angle relative to the first surface, and wherein the second surfaces of the two tongues extend substantially parallel to each other.

18. The blade coupler of claim 11, wherein the sidewalls extend along the two lateral sides of the blade responsive to insertion of the blade into the blade channel.

19. The blade coupler of claim 11, wherein the rotatable shaft is positioned on a lawn mower.

20. The blade coupler of claim 11, wherein the two lateral sides of the blade are parallel to one another and disposed on opposite sides of the blade.

\* \* \* \* \*